United States Patent
Ersoy et al.

(10) Patent No.: US 9,291,196 B2
(45) Date of Patent: Mar. 22, 2016

(54) BALL AND SOCKET JOINT FOR A VEHICLE

(75) Inventors: Metin Ersoy, Walluf (DE); Jens Vortmeyer, Preussisch Oldendorf (DE)

(73) Assignee: ZF Friedrichshafen AG, Friedrichshafen (DE)

(*) Notice: Subject to any disclaimer, the term of this patent is extended or adjusted under 35 U.S.C. 154(b) by 964 days.

(21) Appl. No.: 13/459,300

(22) Filed: Apr. 30, 2012

(65) Prior Publication Data

US 2012/0282015 A1 Nov. 8, 2012

(30) Foreign Application Priority Data

May 5, 2011 (DE) .......................... 10 2011 075 324

(51) Int. Cl.
*F16C 11/00* (2006.01)
*F16C 11/06* (2006.01)

(52) U.S. Cl.
CPC ......... *F16C 11/0647* (2013.01); *F16C 11/0652* (2013.01); *Y10T 403/32721* (2015.01)

(58) Field of Classification Search
CPC ............... Y10T 403/32721; Y10T 403/32729; Y10T 403/32737; Y10T 403/32745; Y10T 403/32754; Y10T 403/32762; F16C 11/0647; F16C 11/0652
USPC .......... 403/133–138; 464/139, 141, 142, 143, 464/145
See application file for complete search history.

(56) References Cited

U.S. PATENT DOCUMENTS

| | | | |
|---|---|---|---|
| 1,022,909 A * | 4/1912 | Whitney ........................ | 464/143 |
| 3,296,830 A * | 1/1967 | Runkle ......................... | 464/139 |
| 3,389,928 A | 6/1968 | Wehner | |
| 4,063,834 A | 12/1977 | Hanson et al. | |
| 4,120,597 A | 10/1978 | Millard | |
| 4,372,621 A | 2/1983 | Farrant | |
| 5,464,296 A * | 11/1995 | Broszat ......................... | 403/138 |
| 5,758,986 A * | 6/1998 | Kraps ........................... | 403/135 |
| 5,772,352 A * | 6/1998 | Fukumoto et al. ............. | 403/144 |
| 5,855,448 A * | 1/1999 | Showalter et al. ............. | 403/134 |
| 6,250,840 B1 * | 6/2001 | Urbach et al. ................ | 403/135 |
| 7,048,461 B2 * | 5/2006 | Williams ........................ | 403/27 |
| 7,056,125 B2 * | 6/2006 | Melis et al. ....................... | 439/8 |
| 7,670,078 B2 * | 3/2010 | Elterman et al. .............. | 403/134 |
| 7,753,611 B2 * | 7/2010 | Ergodan ........................ | 403/138 |

FOREIGN PATENT DOCUMENTS

| | | |
|---|---|---|
| CH | 303377 A | 11/1954 |
| DE | 630 181 | 4/1936 |

(Continued)

OTHER PUBLICATIONS

German Search Report issued Jan. 1, 2013 for the corresponding German Application No. 10 2011 075 324.9.

*Primary Examiner* — Gregory Binda
*Assistant Examiner* — Nahid Amiri
(74) *Attorney, Agent, or Firm* — Davis & Bujold, P.L.L.C.; Michael J. Bujold

(57) ABSTRACT

A ball and socket joint comprises a joint ball which is enclosed and rotationally supported by a ball socket. The ball socket has two ball socket parts that move relative to one another in an axial direction. The ball socket parts acts on different sides of the joint ball that are opposite one another in the axial direction. A controllable adjusting device bias the two ball socket parts, relative to one another in the axial direction, so that pressure exerted on the joint ball by the twp ball socket parts can be varied. At least a first of the ball socket parts comprises a main body and at least one bearing section, which is elastically connected to the main body and by which the first ball socket part rests against the joint ball.

15 Claims, 6 Drawing Sheets

(56) References Cited

FOREIGN PATENT DOCUMENTS

| | | |
|---|---|---|
| DE | 1 450 064 | 4/1969 |
| DE | 27 09 084 A1 | 8/1977 |
| DE | 30 23 963 | 1/1981 |
| DE | 102 45 983 A1 | 4/2004 |
| GB | 992 100 | 5/1965 |

* cited by examiner

BALL AND SOCKET JOINT FOR A VEHICLE

This application claims priority from German patent application serial no. 10 2011 075 324.9 filed May 5, 2011.

FIELD OF THE INVENTION

The invention relates to a ball and socket joint for a vehicle, comprising a ball pin, which has a joint ball, a ball socket, which encloses the joint ball and is provided with a pin opening and in which the joint ball of the ball pin is rotatably supported, the ball pin extending through the pin opening, wherein the ball socket has two ball socket parts that can be moved relative to each other in an axial direction, the ball socket parts acting on different sides of the joint ball that are opposite each other in the axial direction, and a controllable adjusting device, by means of which the ball socket parts can be moved relative to each other in the axial direction so that a pressure exerted on the joint ball by the ball socket parts can be varied.

BACKGROUND OF THE INVENTION

From DE 102 45 983 A1, a ball and socket joint is known, comprising a housing, two bearing shell elements disposed in the housing, a joint body that has a pin and a joint ball, the joint ball sitting between the two bearing shell elements, and a housing bottom, which is disposed on the side of the housing facing away from the pin. An adjustable clamping device is disposed between a first of the two bearing shell elements and the housing bottom. The pre-load with which the joint body is clamped between the bearing shell elements can be changed by means of the clamping device. In order to change the mechanical pre-load, the clamping device can have piezoelectric or hydraulic elements, such as a hydraulic piston.

If the pre-load is increased by means of the clamping device, gaps leading to an impermissibly high edge compression can occur at the contact surfaces between the bearing shell elements and the joint ball.

SUMMARY OF THE INVENTION

Proceeding therefrom, the problem to be solved by the invention is that of being able to avoid the aforementioned gap formation for a ball and socket joint of the initially described type.

This problem is solved using a ball and socket joint according to the invention.

The ball and socket joint according to the invention for a vehicle, in particular a motor vehicle, comprises a ball pin, which has a joint ball, a ball socket, which encloses the joint ball and is provided with a pin opening and in which the joint ball of the ball pin is rotatably supported, the ball pin extending through the pin opening, wherein the ball socket has two ball socket parts that can be moved relative to each other in an axial direction, the ball socket parts acting on different sides of the joint ball that are opposite each other in the axial direction, and a controllable adjusting device, by means of which the ball socket parts can be moved relative to each other in the axial direction so that a pressure exerted on the joint ball by the ball socket parts can be varied, wherein at least a first of the ball socket parts comprises a main body and at least one bearing section, which is elastically connected to the main body and by means of which the first ball socket part rests against the joint ball.

A gap formation can be avoided by means of the elastic connection of the bearing section to the main body, because the bearing section can change the position and/or orientation thereof relative to the main body in the event of slight position changes of the first ball socket part relative to the joint ball. The elastic connection thus causes a softness or pliability of the first ball socket part with respect to the joint ball, e.g., if the pressure exerted on the joint ball by the ball socket parts is increased. However, because it should be permissible to also reduce this pressure again, plastic deformation of the first ball socket part is undesired, so according to the invention the connection of the bearing section to the main body is elastic. In particular, a uniform contact pressure between the bearing section and the joint ball under load can be achieved in the ball and socket joint according to the invention.

The main body of the first ball socket part preferably forms a rigid body. Furthermore, the bearing section of the first ball socket part preferably forms a rigid body. In particular, the first ball socket part is made of metal, preferably steel. In particular, the joint ball is also made of metal, preferably steel. Thus the first ball socket part and the joint ball preferably form a metal-metal combination or steel-steel combination. The surface of the joint ball is preferably hardened. The surface of the first ball socket part is also preferably hardened at least in the region in which the first ball socket part rests against the joint ball. The bearing section of the first ball socket part is circumferential in particular. Furthermore, the connection region of the bearing section and the main body in the first ball socket part is preferably circumferential.

The bearing section of the first ball socket part preferably has a bearing surface matched to the outer surface of the joint ball, by means of which bearing surface the bearing section rests against the joint ball. In particular, the bearing surface is circumferential. Because the bearing surface is matched to the outer surface of the joint ball, the bearing surface maintains the contact thereof with the joint ball without lifting off from the joint ball in some regions in the event of slight position changes of the first ball socket part relative to the joint ball. The position and/or orientation of the bearing section relative to the main body can change slightly, which is enabled by the elastic connection. In particular, the bearing surface is concave, preferably spherical. The bearing surface of the first ball socket part is advantageously hardened.

The elastic connection of the bearing section to the main body is preferably achieved by means of a special geometry of the first ball socket part in the connection region of the main body and the bearing section. In particular, the first ball socket part forms a one-piece body made of homogenous material, so that preferably no other material is used to form the elastic connection. According to an embodiment of the invention, the first ball socket part is provided with at least one circumferential material recess in the connection region of the bearing section and the main body. In particular, the material thickness in the connection region is deliberately reduced, which leads to the elastic property of the connection region. For example, the bearing section is connected to the main body by means of a relatively thin web, which forms the elastic connection region of the main body and the bearing section and in particular is circumferential. The connection region or web is shaped like an S or a swan's neck, for example.

According to a development of the invention, a hole, which is open toward the joint ball and partially accommodates the joint ball and the edge of which facing the joint ball is formed by the bearing section, is provided in the ball socket part, in particular in the main body of the ball socket part. The hole advantageously comprises the material recess. In particular, the hole is mushroom-shaped. The main body of the first ball socket part preferably has a cylindrical or substantially cylindrical outer circumferential surface.

According to one embodiment of the invention, the second ball socket part comprises a main body and at least one bearing section, which is elastically connected to the main body and by means of which the second ball socket part rests against the joint ball. In this embodiment, a gap formation can be avoided under load even for the second ball socket part.

The main body of the second ball socket part preferably forms a rigid body. Furthermore, the bearing section of the second ball socket part preferably forms a rigid body. In particular, the second ball socket part is made of metal, preferably steel. The second ball socket part and the joint ball preferably form a metal-metal combination or steel-steel combination. The surface of the second ball socket part is advantageously hardened at least in the region in which the second ball socket part rests against the joint ball. The bearing section of the second ball socket part is circumferential in particular. Furthermore, the connection region of the bearing section and the main body in the second ball socket part is preferably circumferential.

The elastic connection of the bearing section to the main body is preferably achieved by means of a special geometry of the second ball socket part in the connection region of the main body and the bearing section. In particular, the second ball socket part forms a one-piece body made of homogenous material, so that preferably no other material is used to form the elastic connection. The second ball socket part is advantageously provided with at least one circumferential material recess, in particular in the form of an annular groove, in the connection region of the bearing section and the main body. The annular groove is preferably provided on the outer circumferential surface of the second ball socket part and can be used, for example, to fasten a bellows seal to the second ball socket part. The inner circumferential surface of the second ball socket part advantageously extends diagonally or conically in the axial direction in the connection region and is tapered with increasing axial distance from the first ball socket part. In particular, the material thickness in the connection region deliberately reduced, which leads to the elastic property of the connection region. For example, the bearing section is connected to the main body by means of a relatively thin web, which forms the elastic connection region of the main body and the bearing section and in particular is circumferential. The connection region or web is shaped like an S or a swan's neck, for example.

The bearing section of the second ball socket part preferably has a bearing surface matched to the outer surface of the joint ball, by means of which bearing surface the bearing section rests against the joint ball. The bearing surface is preferably circumferential. In particular, the bearing surface is concave, preferably spherical. The bearing surface of the second ball socket part is advantageously hardened.

The bearing surface of the second ball socket part preferably forms a steep angle (wedge angle) with the axial direction. For example, the angle between the bearing surface of the second ball socket part and the axial direction is 15° or approximately 15°. Thus a high contact pressure can be achieved by a relatively low compressive force. Furthermore, the adjusting device can be designed to be relatively weak, because the friction between the joint ball and the ball socket is in particular self-reinforced due to the wedge effect. In a typical operating range, the frictional torque is 60 Nm, for example. However, frictional torques of up to 120 Nm can also be achieved. The aforementioned numerical specifications are merely examples.

The joint ball lies against the ball socket preferably with a lubricant disposed therebetween. The lubricant is advantageously introduced into the ball socket. The lubricant is a traction oil, for example, and in particular increases the friction coefficient under load.

The two ball socket parts can be disposed in a ball and socket joint housing. The second ball socket part, in particular the main body of the second ball socket part, preferably has a circumferential wall and an interior, which is bounded by the circumferential wall and in which the first ball socket part is disposed and movably guided in the axial direction. The second ball socket part thus forms a ball and socket joint housing itself, so that an additional ball and socket joint housing can be forgone. The first ball socket part can therefore be considered a piston, which is movably guided in the axial direction in the second ball socket part, which forms a cylinder in this sense. The interior preferably comprises a cylindrical inner circumferential surface, on which in particular the main body of the first ball socket part is movably guided in the axial direction at the cylindrical outer circumferential surface of the main body of the first ball socket part. The inner circumferential surface is advantageously formed by the wall of the second ball socket part.

The first ball socket part preferably can be moved relative to the second ball socket part in the axial direction by means of the adjusting device. Thus the pressure that the ball socket parts exert on the joint ball can be set by means of the adjusting device. This pressure determines the friction between the joint ball and the ball socket, so that this friction can be varied by means of the adjusting device. For this purpose, the adjusting device is preferably connected to a control device, by means of which the adjusting device can be controlled.

The adjusting device can be a hydraulic or electric adjusting device. For example, the adjusting device can comprise piezoelectric elements, by means of which the first ball socket part can be moved relative to the second ball socket part. According to a development of the invention, the adjusting device has a drive and one or at least one transmission, which comprises a first transmission part having ball tracks, which rise in the axial direction and extend curved, in particular in a spiral shape, around a rotational axis oriented in the axial direction and in each of which at least one ball is guided, and a second transmission part, which is in contact with the balls, which are disposed between the transmission parts in the axial direction, wherein the balls and the first transmission part can be rotated about the rotational axis relative to each other by means of the drive. If the balls and the first transmission part are rotated about the rotational axis relative to each other, the balls are moved along the ball tracks, so that the axial distance between the transmission parts changes as a result of the axial rise of the ball tracks. The adjusting device thus forms an axial stroke device, which can be driven by the drive and by means of which in particular the first ball socket part can be moved relative to the second ball socket part in the axial direction. This embodiment of the adjusting device can be designed very compact and avoids the leakage problems associated with a hydraulic system. The drive is preferably a motor, in particular an electric motor.

Preferably a longitudinal axis that extends in the axial direction and that passes through the center point of the joint ball is associated with the ball joint. This longitudinal axis is also referred to as the center longitudinal axis in particular. Advantageously, the rotational axis is formed by the longitudinal axis or coincides with the longitudinal axis.

A ball guiding element, which has radially extending slits, in which the balls are movably guided, in particular radially, is advantageously disposed between the transmission parts. The ball guiding element can be designed in the shape of a star wheel, for example. The expression "radial" refers in particular to a direction or an arbitrary direction that extends perpendicularly to the axial direction. For example, the ball guiding element is connected to the second transmission part in a rigid or rotationally rigid manner. However, the ball guiding element can also be rotatable relative to the transmission parts about the rotational axis as an alternative. The ball guiding element is preferably made of metal, in particular steel.

According to one embodiment of the invention, the first transmission part can be driven by the drive, in particular can be rotated by the drive about the rotational axis relative to the balls. The drive is preferably connected to the first transmission part, an additional transmission, which is designed for example as a planetary transmission, being disposed therebetween. A higher transmission ratio can be achieved by means of the additional transmission. If the additional transmission is designed as a planetary transmission, a relatively flat and compact construction can also be achieved. This enables the use of a relatively small drive, so that the adjusting device can be integrated into the ball and socket joint. While the first transmission part is rotated, the balls run along the ball tracks, wherein the axial distance between the transmission parts is changed as a result of the ball tracks of the first transmission part rising in the axial direction. Because the ball tracks of the first transmission part are curved around the rotational axis, in particular the distance of the balls from the rotational axis also changes.

According to another embodiment of the invention, the balls can be driven by the drive, in particular can be rotated by the drive about the rotational axis relative to the first transmission part. The drive is preferably coupled to the balls, advantageously by means of the ball guiding element and/or the second transmission part. The ball guiding element and/or the second transmission part preferably can be driven by the drive, in particular can be rotated by the drive about the rotational axis relative to the first transmission part, wherein the balls preferably are in an entraining connection with the ball guiding element and/or the second transmission part. The drive is advantageously connected to the ball guiding element and/or the second transmission part, an additional transmission, which is designed for example as a planetary transmission, being disposed therebetween. By the rotation of the ball guiding element and/or the second transmission part about the rotational axis, the balls are guided along the ball tracks, wherein the axial distance between the transmission parts is changed as a result of the ball tracks of the first transmission part rising in the axial direction. Because the ball tracks of the first transmission part are curved around the rotational axis, in particular the distance of the balls from the rotational axis also changes.

The second transmission part is, for example, formed by the first ball socket part and/or connected to the first ball socket part. If the second transmission part forms a separate part in this case, the first ball socket part preferably can be moved in the axial direction by means of the second transmission part. Alternatively, the first transmission part is, for example, formed by the first ball socket part and/or connected to the first ball socket part. If the first transmission part forms a separate part in this case, the first ball socket part preferably can be moved in the axial direction by means of the first transmission part.

The points at which the second transmission part is in contact with the balls lie, for example, in a plane extending perpendicularly to the axial direction. According to a development of the invention, the second transmission part is provided with ball tracks, in which the balls are guided. These ball tracks preferably face the ball tracks of the first transmission part, wherein pairs of ball tracks facing each other form ball track pairs. Thus the balls are guided in the ball track pairs and in particular enclosed by the ball track pairs. The ball tracks of the second transmission part lie, for example, in a plane extending perpendicularly to the axial direction or are inclined in the axial direction. The ball tracks of the second transmission part preferably extend in the radial direction. Alternatively to a radial course, the ball tracks of the second transmission part can also be curved around the rotational axis. In this case, the ball tracks of the second transmission part each extend, for example, around the rotational axis in a spiral shape.

According to a development of the invention, radially extending guides are provided, in which the balls are each movably guided in a radial direction. Advantageously, the guides and the first transmission part can be rotated relative to each other about the rotational axis by means of the drive. The guides can be provided on the second transmission part. For example, the guides are formed by the ball tracks of the second transmission part. However, if the ball guiding element is present, the radially extending guides can also be formed by the slits of the ball guiding element. In this case, the ball tracks of the second transmission part can be omitted, so that the face of the second transmission part that faces the first transmission part and against which the balls rest is flat, for example. But this should not be considered restrictive, so that the ball tracks of the second transmission part can be present despite the ball guiding element.

The invention preferably creates a ball and socket joint for high frictional torques that is characterized by a special shape, material selection, and surface quality. The friction of the joint ball in the ball socket preferably can be self-reinforced by the wedge effect. In particular, the ball and socket joint according to the invention has the following advantages:

The special shape of the connection regions enables a low contact pressure.

The contact pressure can be self-reinforced by the wedge effect.

Positive driving dynamics effects can be achieved, in particular during stable straight driving. Furthermore, steering vibrations can be damped and the pitch behavior of the vehicle can be improved.

BRIEF DESCRIPTION OF THE DRAWINGS

The invention is described below using a preferred embodiment with reference to the drawings. In the drawings.

DETAILED DESCRIPTION OF THE PREFERRED EMBODIMENTS

Figure 1:
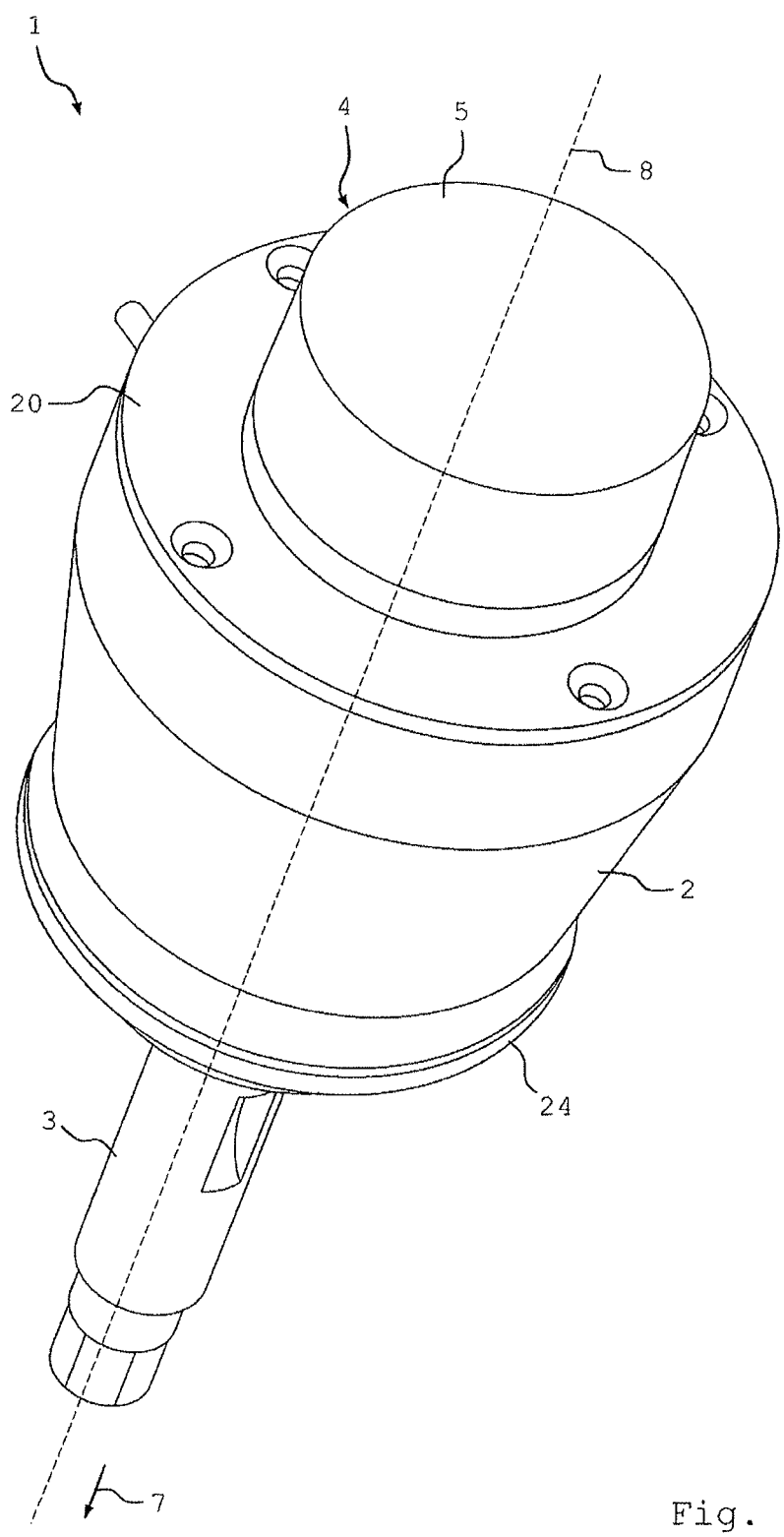
FIG. 1 shows a perspective depiction of a ball and socket joint according to an embodiment of the invention.

Different depictions and partial depictions of a ball and socket joint 1 according to an embodiment of the invention can be seen in FIGS. 1 to 6, the ball and socket joint having a housing 2, in which a ball pin 3 is supported in a rotatable and pivotable manner. The friction of the ball pin 3 during motion relative to the housing 2 can be varied by means of an adjusting device 4, which is rigidly connected to the housing 2 and has an electric motor 5 and a transmission arrangement 6 (see FIG. 2). The central longitudinal axis of the ball and socket joint 1 extending in an axial direction 7 is marked with the reference symbol 8.

Figure 2:
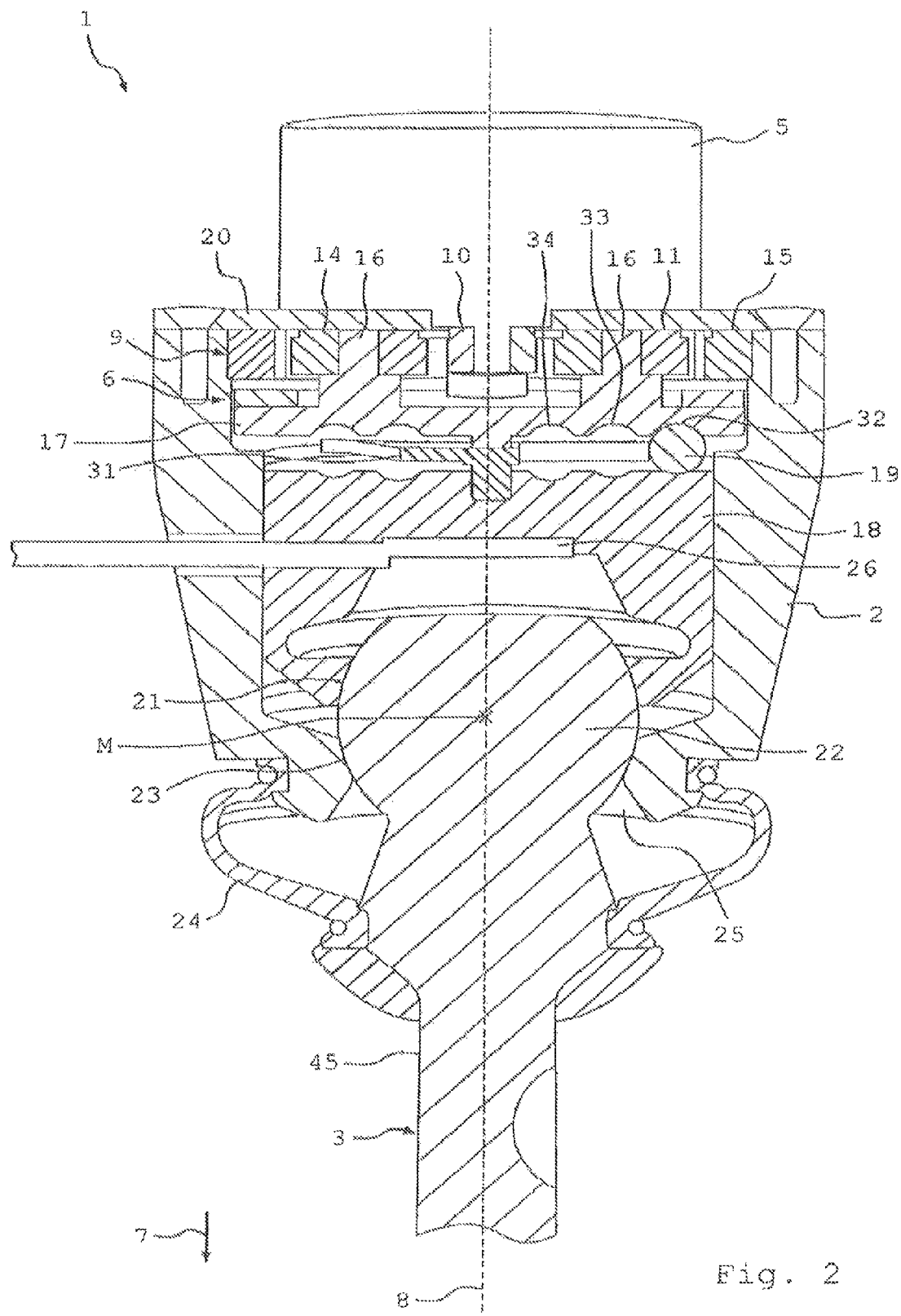
FIG. 2 shows a longitudinal section through the ball and socket joint.
Figure 3:
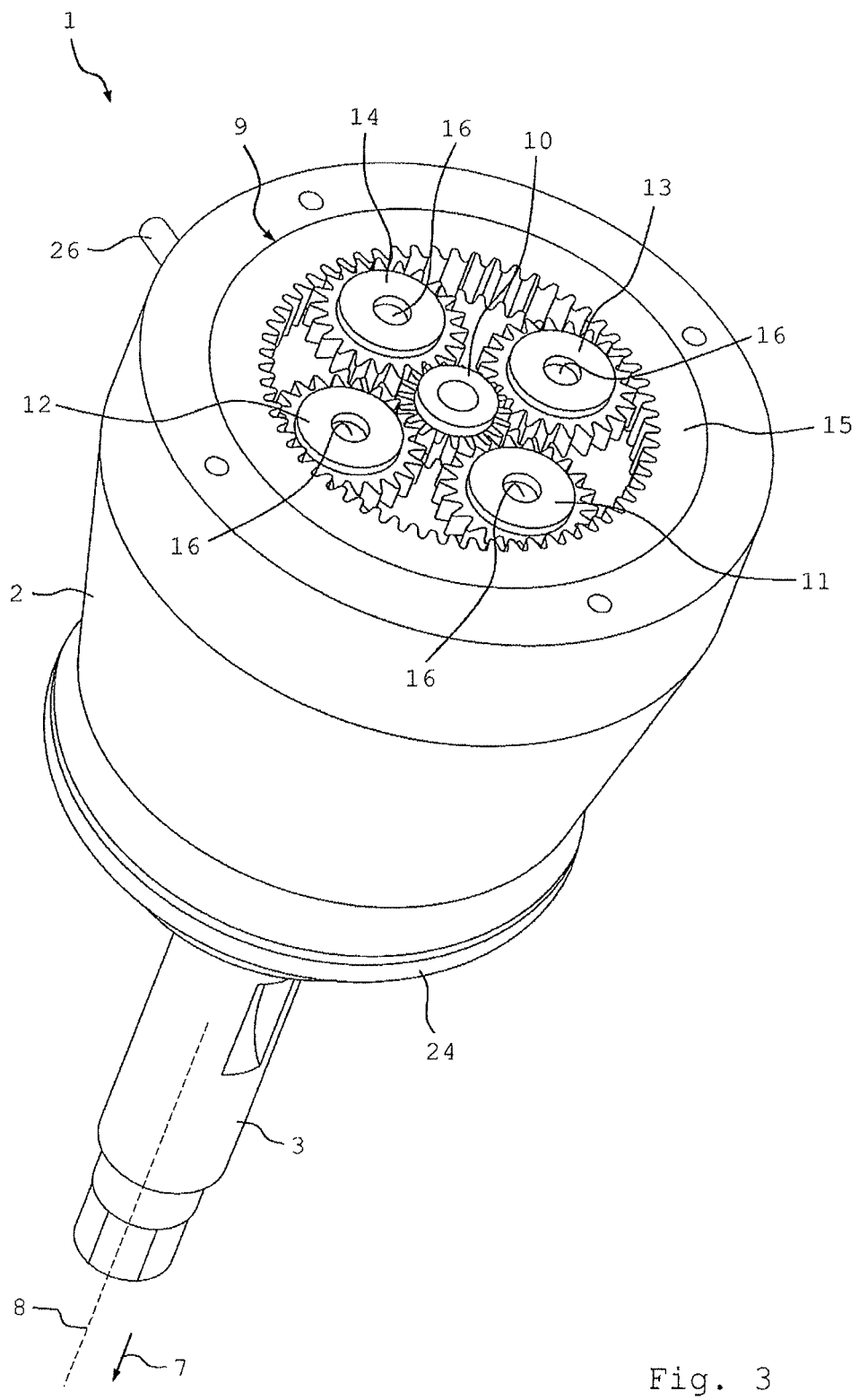
FIG. 3 shows a perspective depiction of the ball and socket joint with the motor removed.

A section of the ball and socket joint 1 along the longitudinal axis 8 can be seen in FIG. 2, wherein the motor 5 is depicted uncut. The transmission arrangement 6 has a planetary transmission 9, which can be seen in a perspective depiction in FIG. 3. The planetary transmission 9 comprises a sun gear 10, which can be rotated about the longitudinal axis 8 by means of the motor 5. The sun gear 10 meshes with planet gears 11, 12, 13, and 14, which together with the sun gear 10 are disposed in a ring gear 15 having internal teeth and mesh with the ring gear. The sun gear 10 and the planet gears 11, 12, 13, and 14 each have external teeth. Furthermore, the planet gears are rotatably supported on pins 16 of a transmission part 17, which can be rotated by means of the planet gears about the longitudinal axis 8, which thus forms a rotational axis. The transmission part 17 interacts with a transmission part 18 by means of balls 19 in such a way that the transmission part 18 is moved in the axial direction 7 relative to the housing 2 as a result of rotation of the transmission part 17 about the longitudinal axis 8. The transmission part 18 is thus movably supported in the housing 2 in the axial direction 7. In contrast, the planetary transmission 9 is stationary in the axial direction relative to the housing 2. The transmission arrangement 6 thus has a second transmission, which comprises the transmission parts 17 and 18 and the balls 19, in addition to the planetary transmission 9. Furthermore, the transmission arrangement 6 disposed in the housing 2 is covered by a cover 20 fastened to the housing 2 and is thus protected from contaminants.

A circumferential bearing surface 21 of the transmission part 18 rests against a joint ball 22 of the ball pin 3, which furthermore rests against a circumferential bearing surface 23 of the housing 2. The bearing surfaces 21 and 23 are arranged on different sides in the axial direction with respect to the center point M of the joint ball 22, so that the housing 2 and the transmission part 18 together from a two-piece ball socket, which encloses the joint ball 22 and in which the joint ball 22 is rotatably supported. Thus the transmission part 18 can be referred to as the first ball socket part and the housing 2 can be referred to as the second ball socket part. Furthermore, a bellows seal 24 is fastened to the housing 2 and encircles a pin opening 25 of the housing 2, through which pin opening the ball pin 3 extends. The end of the bellows seal 24 facing away from the housing 2 encircles the ball pin 3 and, outside of the housing 2, rests against a pin region 45 of the ball pin 3 in a sealing manner.

An angular sensor 26, by means of which motion of the ball pin 3 relative to the housing 2 can be detected, is disposed in the transmission part 18 near the joint ball 22. In particular, rotation of the ball pin 3 about the longitudinal axis 8 of the ball pin and/or a pivot of the ball pin 3 about the center point M of the joint ball 22 of the ball pin can be detected by means of the angular sensor 26.

Figure 4:
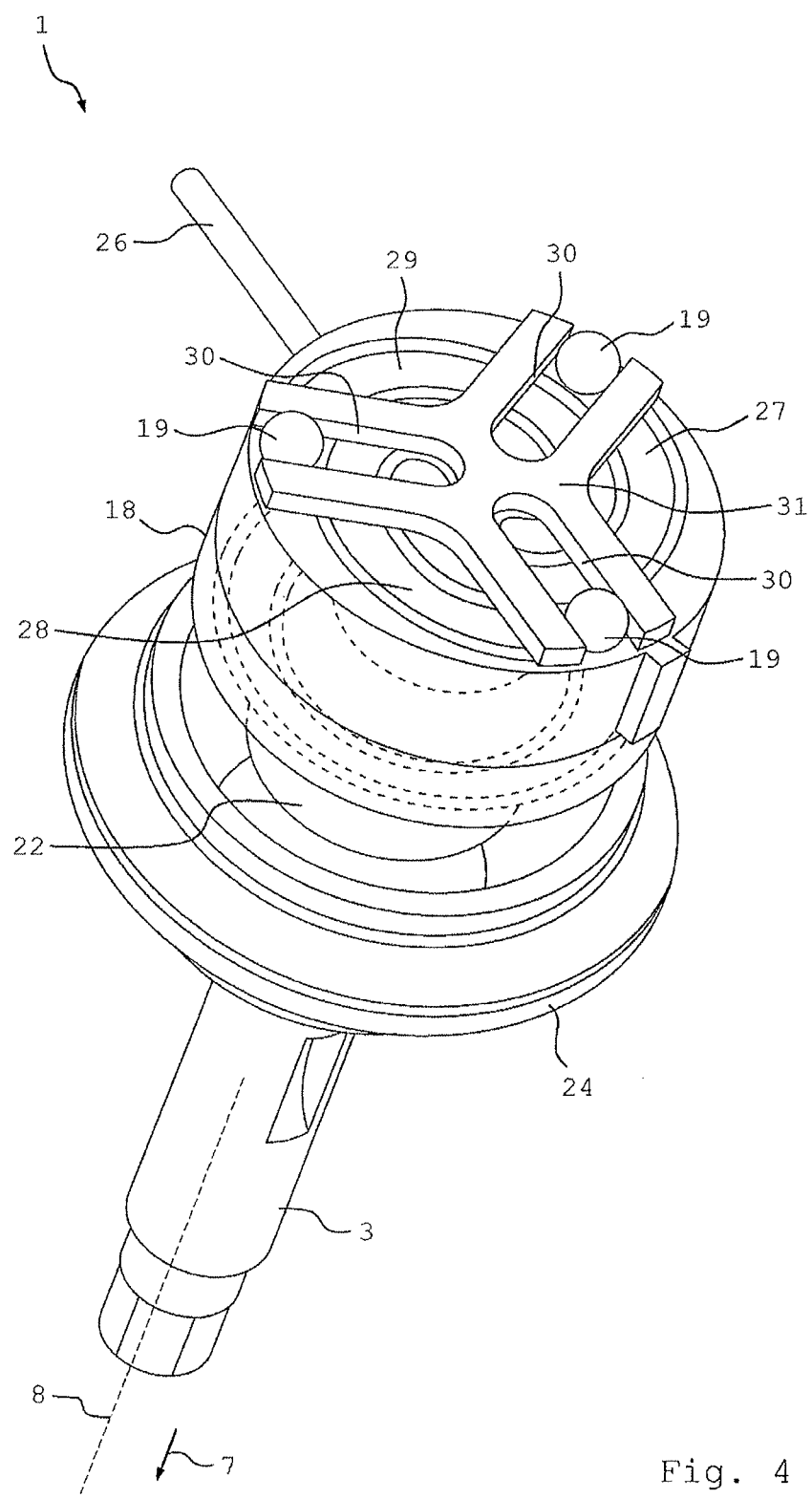
FIG. 4 shows a perspective depiction of part of the adjusting device that can be seen in FIG. 2.
Figure 5:
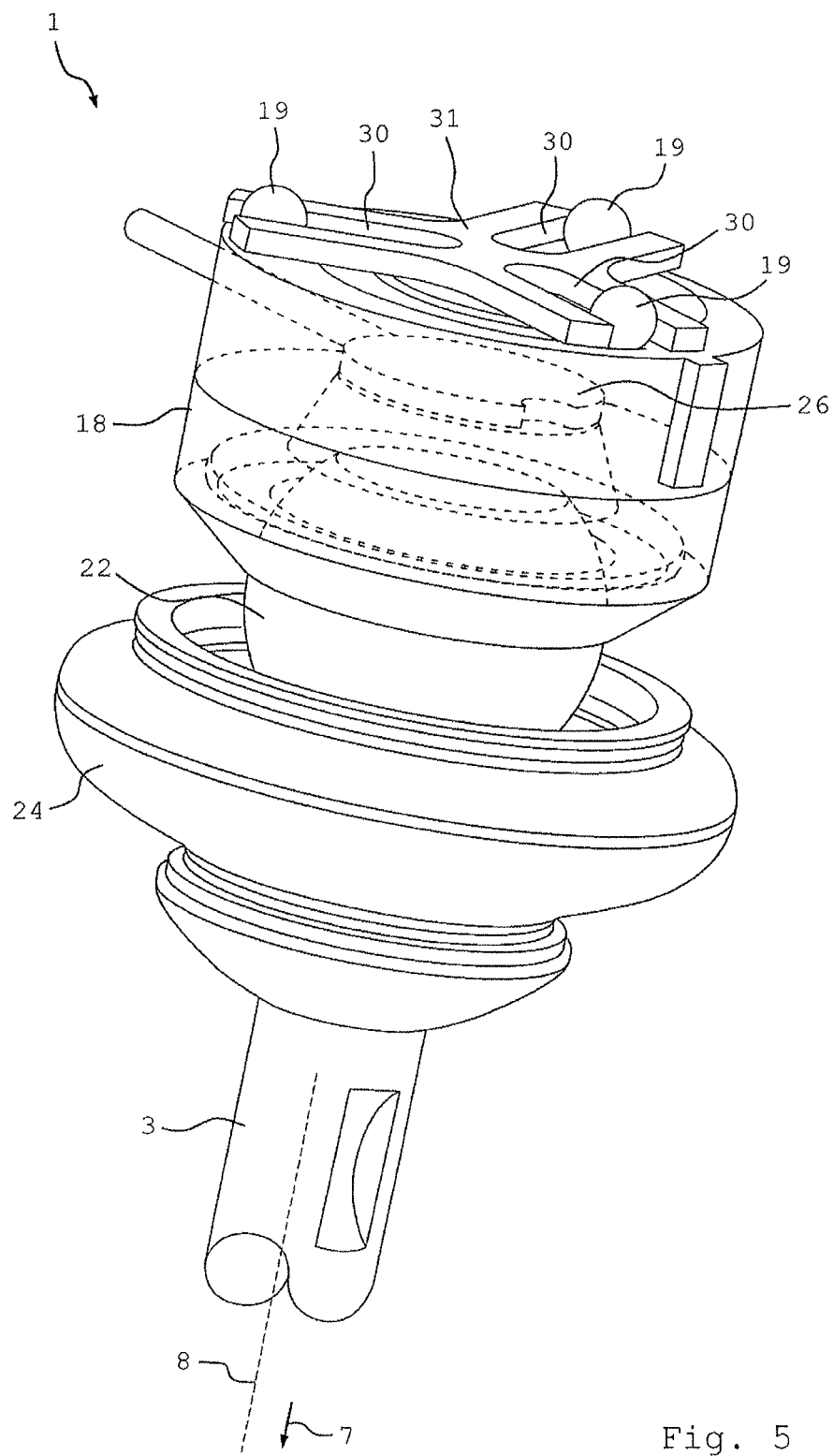
FIG. 5 shows another perspective depiction of part of the adjusting device that can be seen in FIG. 2.

The interaction of the transmission parts 17 and 18 via the balls 19 is now described with reference to FIGS. 2, 4, and 5. Several ball tracks 27, 28, and 29, which rise in the axial direction and extend around the longitudinal axis 8 in a spiral shape and in each of which one of the balls 19 lies, are provided in the transmission part 18. The ball tracks 27, 28, and 29 are preferably offset from each other by 120° with respect to the longitudinal axis 8. Furthermore, the transmission part 18 is connected to the housing 2, preferably in a rotationally rigid manner with respect to the longitudinal axis 8. The balls 19 are additionally guided in a radially movable manner in radial slits 30 of a star wheel 31. The slits 30 are preferably offset from each other by 120° with respect to the longitudinal axis 8. Furthermore, several ball tracks 32, 33, and 34, which face the ball tracks 27, 28, and 29, are provided in the transmission part 17. The ball tracks 32, 33, and 34 can each extend radially or curved around the longitudinal axis 8, for example in a spiral shape. The ball tracks 32, 33, and 34 are preferably offset from each other by 120° with respect to the longitudinal axis 8. The ball tracks 32, 33, and 34 advantageously lie in a plane extending perpendicularly to the longitudinal axis 8. If the star wheel 31 is connected to the transmission part 17 in a rotationally rigid manner, the ball tracks 32, 33, and 34 can be omitted. But this should not be considered restrictive, so that the ball tracks 32, 33, and 34 can also be present. If the ball tracks 32, 33, and 34 extend radially with respect to the longitudinal axis 8, the star wheel 31 can be omitted. But this should not be considered restrictive, so that the star wheel 31 can also be present.

Pairs of ball tracks facing each other each form a ball track pair, which encloses the respective ball 19. If the transmission part 17 is rotated about the longitudinal axis 8 in a first direction, the balls 19 travel along the ball tracks radially inward and move the transmission part 18 in the axial direction 7, so that the transmission part presses against the joint ball 22 axially by means of the bearing surface 21 of the transmission part. A pressure exerted on the joint ball 22 by the bearing surfaces 21 and 23 can thereby be increased. If in contrast the transmission part 17 is rotated about the longitudinal axis 8 in a second rotational direction opposite the first rotational direction, the balls 19 travel radially outward, so that the transmission part 18 can be moved in the opposite direction of the arrow 7, whereby the pressure exerted on the joint ball 22 by the bearing surfaces 21 and 23 is reduced. Thus, the pressure exerted on the joint ball 22 and thereby also the friction of the joint ball 22 against the bearing surfaces 21 and 23 can be varied by the electric motor 5.

Figure 6:
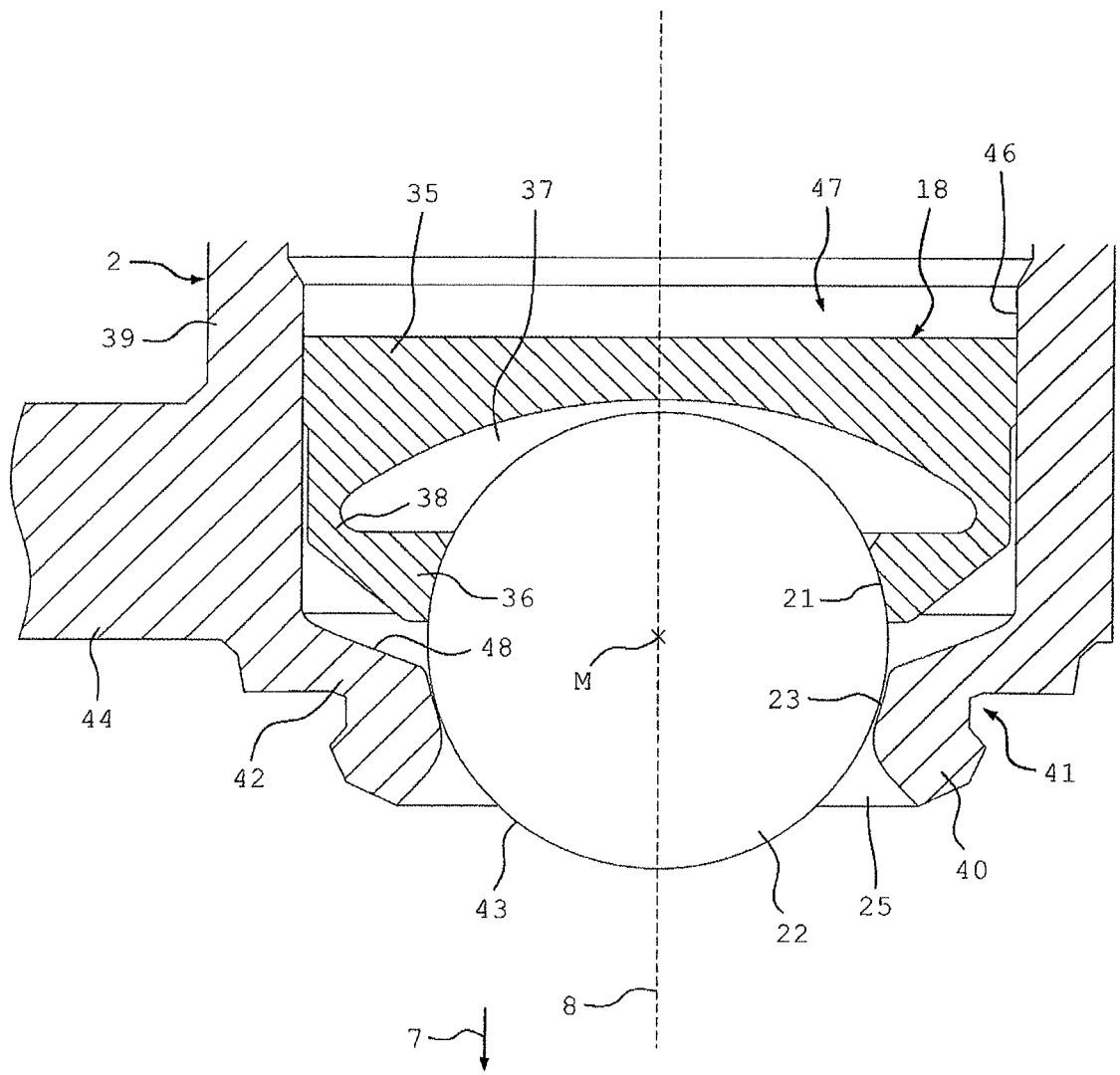
FIG. 6 shows part of a longitudinal section through the ball and socket joint.

A partial longitudinal section through the ball and socket joint 1 can be seen in FIG. 6, wherein the joint ball 22 is merely indicated schematically. The first ball socket part 18 comprises a main body 35 and a circumferential bearing section 36, which comprises the bearing surface 21. A mushroom-shaped hole 37, into which the joint ball 22 is inserted, is provided in the ball socket part 18. The hole 37 causes a reduction of the material thickness in the transition region 38 between the main body 35 and the bearing section 36, so that the bearing section is elastically connected to the main body 35 by means of the connection region 38. The connection region 38 thus forms a relatively thin, circumferential web of low material thickness.

The second ball socket part 2 comprises a wall 46, which bounds a substantially cylindrical interior 47, in which the ball socket part 18 is movably guided in the axial direction 7. Furthermore, the second ball socket part 2 comprises a main body 39, which comprises the wall 46, and a circumferential bearing section 40, which comprises the bearing surface 23. The second ball socket part 2 is provided with an annular groove 41, which causes a reduction of the material thickness in the connection region 42 of the main body 39 to the bearing section 40, on the outer circumferential surface of the second ball socket part. Furthermore, the inner circumferential surface 48 of the second ball socket part 2 extends diagonally or conically in the axial direction 7 in the connection region 42 and is tapered with increasing axial distance from the first ball socket part 18. The connection region 42 is elastic due to the low material thickness of the connection region, so that the bearing section 40 is elastically connected to the main body 39 by means of the connection region 42. The connection region 42 thus forms a relatively thin, circumferential web of low material thickness. The annular groove 41 is simultaneously used to fasten the bellows seal 24 to the housing 2 (see FIG. 2).

The two ball socket parts 2 and 18 and the joint ball 22 are each made of steel. Furthermore, the bearing surfaces 21 and 23 are each concave or spherical and matched to the outer surface 43 of the joint ball 22.

The ball and socket joint 1 is a chassis component of a motor vehicle that is connected to another chassis component or to a vehicle body by means of a connecting element 44 rigidly connected to the housing 2.

LIST OF REFERENCE SYMBOLS

1 Ball and socket joint
2 Ball and socket joint housing/second ball socket part
3 Ball pin
4 Adjusting device
5 Electric motor
6 Transmission arrangement
7 Axial direction
8 Central longitudinal axis
9 Planetary transmission
10 Sun gear
11 Planet gear
12 Planet gear
13 Planet gear
14 Planet gear
15 Ring gear having internal teeth
16 Pins
17 Transmission part
18 Transmission part/first ball socket part
19 Ball
20 Cover
21 Bearing surface
22 Joint ball
23 Bearing surface
24 Bellows seal
25 Pin opening
26 Angular sensor
27 Ball track
28 Ball track
29 Ball track
30 Radial slit
31 Star wheel
32 Ball track
33 Ball track
34 Ball track
35 Main body
36 Bearing section
37 Mushroom-shaped hole
38 Connection region
39 Main body
40 Bearing section
41 Annular groove/material recess
42 Connection region
43 Outer surface of the joint ball
44 Connecting element
45 Pin region of the ball pin
46 Wall of the housing
47 Interior of the housing
48 Inner circumferential surface
M Center point of the joint ball

The invention claimed is:

1. A ball and socket joint for a vehicle, the ball and socket joint comprising:
a ball pin (3) comprising a joint ball (22),
a ball socket enclosing the joint ball (22) and being provided with a pin opening (25) in which the joint ball (22) of the ball pin (3) being rotatably supported, and the ball pin extending through the pin opening (25),
the ball socket having first and second ball socket parts (18, 2) that are movable in an axial direction (7) relative to one another, and the first and the second ball socket parts acting on different sides of the joint ball (22) that are opposite one another in the axial direction (7),
a controllable adjusting device (4) for moving the first and the second ball socket parts (18, 2), relative to one another in the axial direction (7), and varying pressure exerted on the joint ball (22) by the first and the second ball socket parts (18, 2),
a motor being coupled to and supplying drive to the controllable adjusting device (4), and
at least the first ball socket part (18) comprising a main body (35) and at least one bearing section (36) being elastically connected to the main body and resting against the joint ball (22).

2. The ball and socket joint according to claim 1, wherein the bearing section (36) of the first ball socket part (18) has a circumferential bearing surface (21) which mates with an outer surface (43) of the joint ball (22) and rests against the joint ball (22).

3. The ball and socket joint according to claim 1, wherein the first ball socket part (18) is provided with at least one circumferential material recess in a connection region (38) of the bearing section (36) and the main body (35).

4. The ball and socket joint according to claim 1, wherein a mushroom-shaped hole (37), which is open toward the joint ball (22) and partially accommodates the joint ball and an edge of which facing the joint ball (22) is formed by the bearing section (36), is provided in the first ball socket part (18).

5. The ball and socket joint according to claim 1, wherein the first ball socket part (18) is made of metal.

6. The ball and socket joint according to claim 1, wherein the second ball socket part (2) comprises a main body (39) and at least one bearing section (40), which is elastically connected to the main body and by which the second ball socket part (2) rests against the joint ball (22).

7. The ball and socket joint according to claim 6, wherein the bearing section (40) of the second ball socket part (2) has a circumferential bearing surface (23), which mates with an outer surface (43) of the joint ball (22) and rests against the joint ball (22).

8. The ball and socket joint according to claim 6, wherein the second ball socket part (2) is provided with at least one circumferential material recess (41) in a connection region (42) of the bearing section (40) and the main body (39).

9. The ball and socket joint according to claim 6, wherein the second ball socket part (2) is made of metal.

10. The ball and socket joint according to claim 1, wherein the second ball socket part (2) has a circumferential wall (46) and an interior (47), which is bounded by the circumferential wall, and the first ball socket part (18) is disposed and movably guided, in the axial direction (7), by the circumferential (46).

11. A ball and socket joint for vehicle, the ball and socket joint comprising:
- a ball pin (3) comprising a joint ball (22),
- a ball socket enclosing the joint ball (22) and being provided with a pin opening (25) in which the joint ball (22) of the ball pin (3) being rotatably supported, and the ball pin extending through the pin opening (25),
- the ball socket having first and second ball socket parts (18, 2) that are movable relative to one another in an axial direction (7), and the first and the second ball socket parts acting on different sides of the joint ball (22) that are opposite one another in the axial direction (7),
- a controllable adjusting device (4) by which the first and the second ball socket parts (18, 2) are biased relative to one another in the axial direction (7) so that pressure exerted on the joint ball (22), by the first and the second ball socket parts (18, 2), is variable,
- at least the first ball socket part (18) comprising a main body (35) and at least one bearing section (36) being elastically connected to the main body and by which the first ball socket part (18) rests against the joint ball (22), and
- a first transmission part (18) having ball tracks (28, 29, 30), which rise in the axial direction (7) and extend in a spiral shape around a rotational axis (8) oriented in the axial direction (7) and in each of which at least one ball (19) is guided, and a second transmission part (17), which is in contact with the balls (19) disposed between the first and the second transmission parts (17, 18) in the axial direction (7), and the balls (19) and the first transmission part (18) are rotatable about the rotational axis (8) relative to one another by a drive (5).

12. The ball and socket joint according to claim 11, wherein points at which the second transmission part (17) is in contact with the balls (19) are disposed in a plane extending perpendicularly to the axial direction (7).

13. The ball and socket joint according to claim 11, wherein a ball guiding element (31) is disposed between the first and the second transmission parts (17, 18) and has radially extending slits (30) in which the balls (19) are movably guided.

14. The ball and socket joint according to claim 11, wherein the second transmission part (17) is provided with ball tracks (32, 33, 34) in which the balls (19) are movably guided.

15. A ball and socket joint for a vehicle, the ball and socket joint comprising:
- a ball pin (3) having a joint ball (22) extending along an axis (8);
- a ball socket enclosing and rotatably supporting the joint ball (22), and the ball socket having a pin opening (25) through which the ball pin (3) extends,
- the first ball socket part (18) comprising a main body (35) and at least one bearing section (36) which is elastically connected to the main body (35), and the at least one bearing section (36) abutting against a second side of the joint ball (22),
- the ball socket having first and second ball socket parts (18, 2) that are axially movable relative to one another along the axis (8), and the second ball socket part (2) abutting a first side of the joint ball (22),
- the first and the second sides of the joint ball (22) being axially opposite one another with respect to the axis (8);
- a controllable adjusting device (4) by which the first and the second ball socket parts (18, 2) are biased relative to one another along the axis (8) such that pressure exerted on the joint ball (22), by the first and the second ball socket parts (18, 2), is variable, and
- a motor being coupled to the controllable adjusting device (4) for driving the controllable adjusting device (4), and when the controllable adjusting device (4) is driven by the motor in a first direction, the first and the second ball socket parts (18, 2) increase the pressure exerted on the joint ball (22), but when the controllable adjusting device (4) is driven by the motor in an opposite second direction, the first and the second ball socket parts (18, 2) decrease the pressure exerted on the joint (22).

* * * * *